May 29, 1945.   F. R. BUCKLEY   2,376,957
TOOL FOR ALIGNING PLATES
Filed Aug. 11, 1943
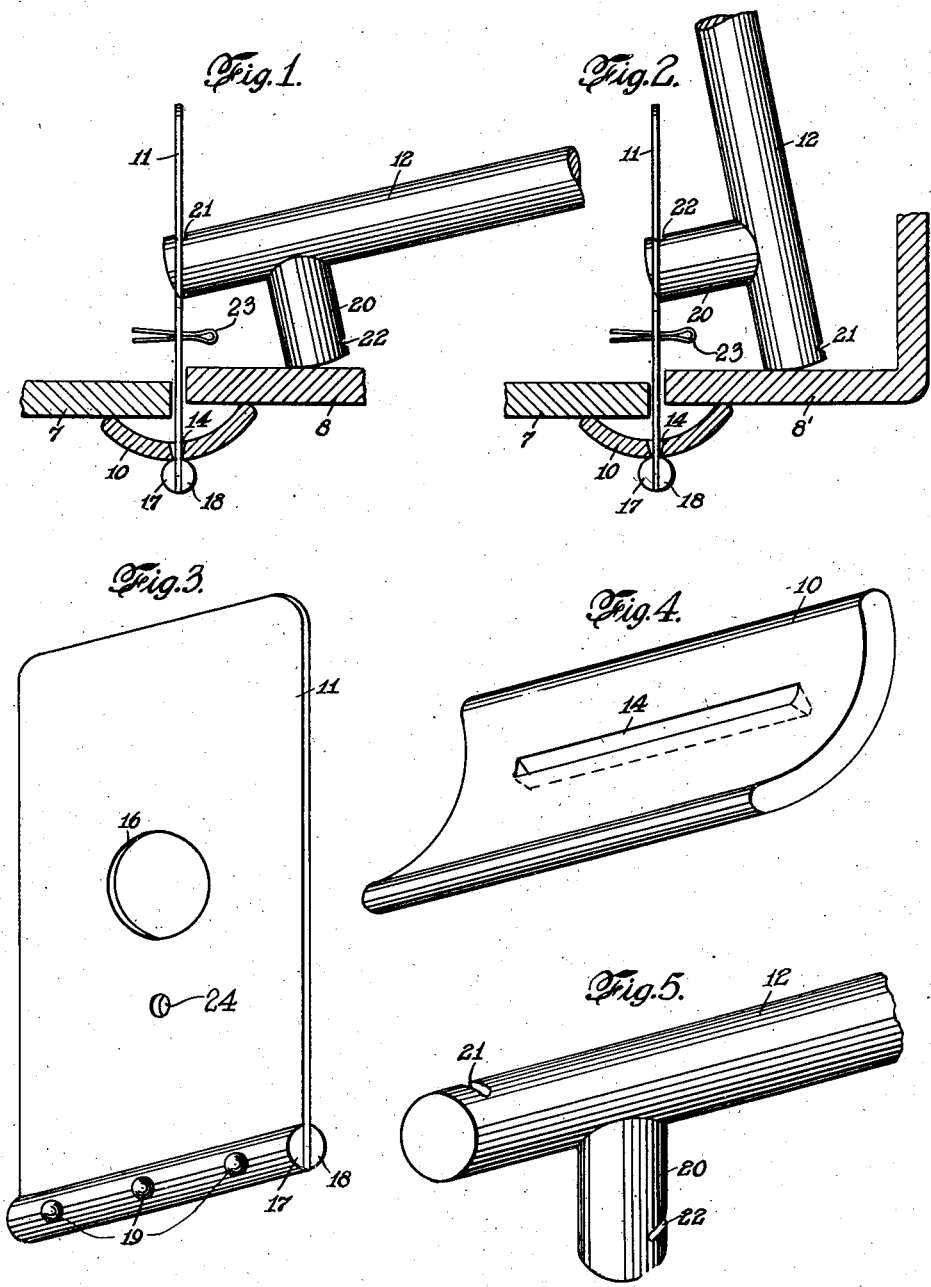
INVENTOR.
FRANK R. BUCKLEY
BY
ATTORNEYS.

Patented May 29, 1945

2,376,957

UNITED STATES PATENT OFFICE 2,376,957

TOOL FOR ALIGNING PLATES

Frank R. Buckley, Nutley, N. J., assignor of one-third to William L. Forker, East Orange, and one-third to Dudley Smythe, Lyndhurst, N. J.

Application August 11, 1943, Serial No. 498,251

5 Claims. (Cl. 113—99)

This invention relates to a plate-aligning tool which is particularly adapted and intended for forcing into alignment the edges of two plates preparatory to welding their edges together.

In the building of ships and other metal structures, difficulty has been found in properly aligning metal plates preparatory to welding their edges together. When such plates are laid adjacent one another with the proper distances between their edges, usually about 3/32 of an inch, the planes of said plates are often somewhat out of alignment, and it is necessary to bring those planes into substantial alignment before the welding operation is commenced by the making of "tack" welds at intervals along the space between the edges of the plates. The methods now generally in use for bringing into alignment plates which are to be welded, require the expenditure of considerable time and labor. One of the methods commonly employed requires welding to one of the plates an angle member which extends over the other plate, and the driving of wedges between said angle member and the plate over which it extends, thereby bringing the plates into alignment. After the tack weld or welds have been made, the wedges must be removed, the angle member must be separated from the plate to which it was welded, and the spot to which the angle member was welded must be smoothed over and the marks of the weld eradicated. Such procedures involve the employment of several different craftsmen, and very considerable time and expense.

By the use of the present invention, the operation of aligning metal plates, preparatory to welding their edges together, is greatly expedited and the total cost of the welding operation is greatly reduced. That will be apparent from the following description of my plate-aligning tool and of the way in which it is employed.

In the drawing, Fig. 1 is a side elevation partly in section and broken away, showing my aligning tool, arranged in cooperation with the metal plates which are to be aligned and ready for the aligning operation; Fig. 2 is a side elevation similar to Fig. 1 with the lever member of the aligning tool arranged differently from the arrangement shown in Fig. 1; Fig. 3 is a perspective elevation of the tension member of my aligning tool; Fig. 4 is a perspective view of the bridge member of my aligning tool; and Fig. 5 is a perspective view of one end of the lever member of my aligning tool.

Referring to the drawing, the metal plates which are to be aligned before welding are shown at 7 and 8 in Fig. 1 and at 7 and 8' in Fig. 2. My aligning tool consists of three parts, namely, a bridge member 10, a tension member 11 and a lever member 12. The form of the bridge member 10 will be apparent from Figs. 1, 2 and 4 which show that it consists of a stout and substantially rigid and transversely curved piece of metal, having a longitudinal opening therein in the form of a slot 14 which is preferably made with converging longitudinal walls as shown in the drawing. The form of the tension member 11 will be apparent from Figs. 1, 2 and 3 which show that it is provided with a hole 16 and an enlarged end constructed in any suitable manner, as by securing half-round strips 17 and 18 to the end of the plate portion by means of rivets 19 passing through the strips 17 and 18 and through the plate portion. Thus a pivotal connection is provided between the tension member 11 and the bridge member 10. The form of the lever member 12 will be evident from Figs. 1, 2 and 5, it being understood that the end of the lever member which is grasped by the operator has been broken away and omitted for convenience in representation. This lever member 12 which is one-piece and rigid may be forged or otherwise fabricated. As will be clear from the drawing, the body portion of the lever member 12 is provided near one end with a lateral extension 20 which is immovable with reference to said body portion, and notches 21 and 22 are preferably provided near the end of the body portion of the lever and near the end of the lateral extension 20 thereof, as shown in the drawing. A cotter pin 23, passing through a hole 24 in the tension member 11, serves to prevent the tension member from accidentally dropping through the slot between the plates 7 and 8 or 8'.

Figs. 1 and 2 show my plate-aligning tool arranged in cooperation with plates 7 and 8 or 8' which are to be brought into alignment. In Fig. 1, the end of the body portion of the lever member 12 is shown as projecting into the hole 16 in the tension member 11 with the notch 21 in engagement with the top of the whole, and with the end of the lateral extension 20 in engagement with the plate 8. In Fig. 2, the offset portion 20 of the lever member 12 is shown inserted in the hole 16 in the tension member 11, and the end of the body portion of the lever member 12 is shown in engagement with the plate 8'. It will be obvious that clockwise movement of the lever member 12, in the arrangement of either Fig. 1 or Fig. 2, will result in exerting a powerful upward force upon the tension member 11 and that this force is transmitted to the bridge member 10;

and that at the same time a powerful force will be exerted in a downward direction upon the plate 8 or 8'. Thus, by the movement of the lever member 12, the plates 7 and 8 or 8' may be forced into alignment with one another and may be held in that position while a tack weld is applied to the adjacent edges of the plates. Then the pressure on the lever member of the aligning tool may be released, and the parts of the aligning tool will be loosened and may be slid along to a new location in cooperation with the plates; whereupon the aligning operation and the tack welding operation may be repeated. Thus the edges of long adjacent plates 7 and 8 or 8' may be quickly and easily brought into alignment and secured by tack welds preparatory to the final seam-welding operation.

I claim:

1. A plate-aligning tool comprising a bridge member adapted to coperate with each of the plates which are to be aligned, a tension member adapted to pass between the plates to be aligned and pivotally connected with said bridge member, and a one-piece, rigid, manually operable lever member having a body portion and a lateral extension therefrom adapted to engage said tension member and one of the plates which is to be aligned with the other plate, whereby by manual pressure on said lever member the said plates may be forced into alignment with one another preparatory to welding together the edges of said plates.

2. A plate-aligning tool comprising a bridge member adapted to cooperate with each of the plates which are to be aligned, a tension member having a hole therein and adapted to pass between the plates to be aligned and pivotally connected with said bridge member, and a one piece, rigid, manually operable lever member having a body portion adapted to enter the hole in said tension member and a lateral extension adapted to cooperate with one of the plates to be aligned with the other plate, whereby by manual pressure on said lever member the said plates may be forced into alignment with one another preparatory to welding together the edges of said plates.

3. A plate-aligning tool comprising a bridge member having an opening therein and adapted to cooperate with each of the plates which are to be aligned, a tension member having a hole therein and having an enlargement thereon and adapted to pass through the opening in said bridge member with said enlargement engaging said bridge member, said tension member also being adapted to pass between the plates to be aligned, and a one piece, rigid, manually operable lever member having a body portion and a lateral extension therefrom adapted to engage the hole in said tension member and one of the plates to be aligned with the other plate, whereby by manual pressure on said lever member the said plates may be forced into alignment with one another preparatory to welding together the edges of said plates.

4. A plate-aligning tool comprising a bridge member adapted to cooperate with each of the plates which are to be aligned, a tension member, having a hole therein and adapted to pass between the plates to be aligned and having a pivotal connection with said bridge member, and a lever member having a main portion and a lateral extension each adapted to enter the hole in said tension member and each adapted to cooperate with one of the plates to be aligned with the other plate, each of said portions of said lever member being provided near its end with a notch adapted to cooperate with the edge of the hole in said tension member, whereby said plates may be forced into alignment with one another by manipulation of said lever member when either portion of the lever member is inserted in said hole.

5. A plate-aligning tool comprising a bridge member adapted to cooperate with each of the plates which are to be aligned, a tension member having a hole therein and adapted to pass between the plates to be aligned and having a pivotal connection with said bridge member, and a manually operable lever member having a main portion and a lateral extension each adapted to enter the hole in said tension member and each adapted to cooperate with one of the plates to be aligned with the other plate, whereby by manual pressure on said lever member said plates may be forced into alignment with one another by manipulation of said lever member when either portion of the lever member is inserted in said hole.

FRANK R. BUCKLEY.